United States Patent
Plunkett et al.

(10) Patent No.: US 7,733,535 B2
(45) Date of Patent: Jun. 8, 2010

(54) METHOD AND APPARATUS FOR IMAGE MANIPULATION VIA A DITHER MATRIX

(75) Inventors: Richard Thomas Plunkett, Balmain (AU); Simon Robert Walmsley, Balmain (AU); Kia Silverbrook, Balmain (AU); Raul Evelio Vera, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 944 days.

(21) Appl. No.: 11/482,980

(22) Filed: Jul. 10, 2006

(65) Prior Publication Data

US 2008/0007786 A1    Jan. 10, 2008

(51) Int. Cl.
*G06K 15/00*    (2006.01)

(52) U.S. Cl. ............... 358/3.14; 358/3.13; 358/535

(58) Field of Classification Search ............... None
See application file for complete search history.

(56) References Cited

U.S. PATENT DOCUMENTS

| | | | |
|---|---|---|---|
| 5,555,102 A * | 9/1996 | Dalton | 358/3.14 |
| 5,703,695 A * | 12/1997 | Nguyen | 358/3.16 |
| 6,002,842 A * | 12/1999 | Oshio et al. | 358/1.9 |
| 6,515,770 B1 | 2/2003 | Rao et al. | |
| 6,539,111 B2 * | 3/2003 | Kuwata | 382/167 |
| 6,690,389 B2 * | 2/2004 | Ulichney | 345/691 |
| 6,714,320 B1 * | 3/2004 | Nakahara et al. | 358/3.13 |
| 6,853,468 B2 * | 2/2005 | Miller et al. | 358/1.9 |
| 6,952,503 B2 * | 10/2005 | Matsuura | 382/274 |
| 7,274,487 B2 * | 9/2007 | Fukasawa | 358/1.9 |
| 7,333,138 B2 * | 2/2008 | Choi | 348/225.1 |
| 7,369,276 B2 * | 5/2008 | Couwenhoven et al. | 358/3.03 |
| 7,518,755 B2 * | 4/2009 | Gotoh et al. | 358/3.06 |
| 7,525,688 B2 * | 4/2009 | Matsushima | 358/1.9 |
| 2004/0080790 A1* | 4/2004 | Abe | 358/3.13 |
| 2004/0217972 A1* | 11/2004 | Deishi | 345/596 |

FOREIGN PATENT DOCUMENTS

EP    1271927 A2    2/2003
JP    2003-110852 A    4/2003

* cited by examiner

*Primary Examiner*—Mark K Zimmerman
*Assistant Examiner*—Dung D Tran

(57) ABSTRACT

Efficiently processing contone image data by determining one or more characteristics of the image data and using these characteristics to manipulate the dither matrix so that the printed image is enhanced.

9 Claims, 4 Drawing Sheets

| | | | 64 | | | |
|---|---|---|---|---|---|---|
| 17 | 23 | 151 | 185 | ........ | 220 |
| 25 | 38 | 201 | 211 | ........ | 233 |
| 79 | 52 | 66 | 99 | ........ | 12 |
| 97 | 44 | 1 | 100 | ........ | 7 |
| 98 | 5 | 26 | 53 | ........ | 24 |
| ⋮ | ⋮ | ⋮ | ⋮ | | ⋮ |
| 255 | 220 | 201 | 173 | ........ | 61 |

(rows: 64)

$$\begin{bmatrix} 32.95 & 37.52 & 135.02 & 160.92 & \cdots\cdots & 187.56 \\ 39.04 & 48.95 & 173.11 & 180.72 & \cdots\cdots & 197.48 \\ 80.18 & 59.61 & 70.27 & 95.41 & \cdots\cdots & 29.14 \\ 93.89 & 53.52 & 20.00 & 96.17 & \cdots\cdots & 25.33 \\ 94.65 & 23.81 & 39.80 & 60.37 & \cdots\cdots & 38.28 \\ \vdots & \vdots & \vdots & \vdots & & \vdots \\ 215.00 & 187.58 & 173.12 & 151.78 & \cdots\cdots & 66.46 \end{bmatrix}$$

FIG. 5

METHOD AND APPARATUS FOR IMAGE MANIPULATION VIA A DITHER MATRIX

FIELD OF THE INVENTION

The present invention relates to digital image processing. In particular, the invention relates to enhancing digital colour images while processing them for printing to a media substrate.

CO-PENDING APPLICATIONS

The following applications have been filed by the Applicant simultaneously with the present application:

| | | | | |
|---|---|---|---|---|
| 11/482,975 | 11/482,970 | 11/482,968 | 11/482,972 | 11/482,971 |
| 11/482,969 | 7,530,663 | 7,467,846 | 11/482,962 | 11/482,963 |
| 11/482,956 | 11/482,954 | 11/482,974 | 11/482,957 | 11/482,987 |
| 11/482,959 | 11/482,960 | 11/482,961 | 11/482,964 | 11/482,965 |
| 7,510,261 | 11/482,973 | 11/482,990 | 11/482,986 | 11/482,985 |
| 11/482,967 | 11/482,966 | 11/482,988 | 11/482,989 | 7,530,446 |
| 11/482,953 | 11/482,977 | 11/482,981 | 11/482,978 | 11/482,982 |
| 11/482,983 | 11/482,984 | | | |

The disclosures of these co-pending applications are incorporated herein by reference.

CROSS REFERENCES TO RELATED APPLICATIONS

Various methods, systems and apparatus relating to the present invention are disclosed in the following US Patents/Patent Applications filed by the applicant or assignee of the present invention:

| | | | | | |
|---|---|---|---|---|---|
| 6,750,901 | 6,476,863 | 6,788,336 | 7,249,108 | 6,566,858 | 6,331,946 |
| 6,246,970 | 6,442,525 | 7,346,586 | 09/505,951 | 6,374,354 | 7,246,098 |
| 6,816,968 | 6,757,832 | 6,334,190 | 6,745,331 | 7,249,109 | 7,197,642 |
| 7,093,139 | 7,509,292 | 10/636,283 | 10/866,608 | 7,210,038 | 7,401,223 |
| 10/940,653 | 10/942,858 | 7,364,256 | 7,258,417 | 7,293,853 | 7,328,968 |
| 7,270,395 | 7,461,916 | 7,510,264 | 7,334,864 | 7,255,419 | 7,284,819 |
| 7,229,148 | 7,258,416 | 7,273,263 | 7,270,393 | 6,984,017 | 7,347,526 |
| 7,357,477 | 7,465,015 | 7,364,255 | 7,357,476 | 11/003,614 | 7,284,820 |
| 7,341,328 | 7,246,875 | 7,322,669 | 7,445,311 | 7,452,052 | 7,455,383 |
| 7,448,724 | 7,441,864 | 7,506,958 | 7,472,981 | 7,448,722 | 11/246,679 |
| 7,438,381 | 7,441,863 | 7,438,382 | 7,425,051 | 7,399,057 | 11/246,671 |
| 11/246,670 | 11/246,669 | 7,448,720 | 7,448,723 | 7,445,310 | 7,399,054 |
| 7,425,049 | 7,367,648 | 7,370,936 | 7,401,886 | 7,506,952 | 7,401,887 |
| 7,384,119 | 7,401,888 | 7,387,358 | 7,413,281 | 6,623,101 | 6,406,129 |
| 6,505,916 | 6,457,809 | 6,550,895 | 6,457,812 | 7,152,962 | 6,428,133 |
| 7,204,941 | 7,282,164 | 7,465,342 | 7,278,727 | 7,417,141 | 7,452,989 |
| 7,367,665 | 7,138,391 | 7,153,956 | 7,423,145 | 7,456,277 | 7,550,585 |
| 7,122,076 | 7,148,345 | 11/172,816 | 7,470,315 | 11/172,814 | 7,416,280 |
| 7,252,366 | 7,488,051 | 7,360,865 | 7,438,371 | 7,465,017 | 7,441,862 |
| 11/293,841 | 7,458,659 | 7,455,376 | 6,746,105 | 11/246,687 | 11/246,718 |
| 7,322,681 | 11/246,686 | 11/246,703 | 11/246,691 | 7,510,267 | 7,465,041 |
| 11/246,712 | 7,465,032 | 7,401,890 | 7,401,910 | 7,470,010 | 11/246,702 |
| 7,431,432 | 7,465,037 | 7,445,317 | 7,549,735 | 11/246,675 | 11/246,674 |
| 11/246,667 | 7,156,508 | 7,159,972 | 7,083,271 | 7,165,834 | 7,080,894 |
| 7,201,469 | 7,090,336 | 7,156,489 | 7,413,283 | 7,438,385 | 7,083,257 |
| 7,258,422 | 7,255,423 | 7,219,980 | 10/760,253 | 7,416,274 | 7,367,649 |
| 7,118,192 | 10/760,194 | 7,322,672 | 7,077,505 | 7,198,354 | 7,077,504 |
| 10/760,189 | 7,198,355 | 7,401,894 | 7,322,676 | 7,152,959 | 7,213,906 |
| 7,178,901 | 7,222,938 | 7,108,353 | 7,104,629 | 7,303,930 | 7,401,405 |
| 7,464,466 | 7,464,465 | 7,246,886 | 7,128,400 | 7,108,355 | 6,991,322 |
| 7,287,836 | 7,118,197 | 10/728,784 | 7,364,269 | 7,077,493 | 6,962,402 |
| 10/728,803 | 7,147,308 | 7,524,034 | 7,118,198 | 7,168,790 | 7,172,270 |
| 7,229,155 | 6,830,318 | 7,195,342 | 7,175,261 | 7,465,035 | 7,108,356 |
| 7,118,202 | 7,510,269 | 7,134,744 | 7,510,270 | 7,134,743 | 7,182,439 |
| 7,210,768 | 7,465,036 | 7,134,745 | 7,156,484 | 7,118,201 | 7,111,926 |
| 7,431,433 | 7,018,021 | 7,401,901 | 7,468,139 | 11/188,017 | 7,128,402 |
| 7,387,369 | 7,484,832 | 11/097,308 | 7,448,729 | 7,246,876 | 7,431,431 |
| 7,419,249 | 7,377,623 | 7,328,978 | 7,334,876 | 7,147,306 | 09/575,197 |
| 7,079,712 | 6,825,945 | 7,330,974 | 6,813,039 | 6,987,506 | 7,038,797 |
| 6,980,318 | 6,816,274 | 7,102,772 | 7,350,236 | 6,681,045 | 6,728,000 |
| 7,173,722 | 7,088,459 | 09/575,181 | 7,068,382 | 7,062,651 | 6,789,194 |
| 6,789,191 | 6,644,642 | 6,502,614 | 6,622,999 | 6,669,385 | 6,549,935 |
| 6,987,573 | 6,727,996 | 6,591,884 | 6,439,706 | 6,760,119 | 7,295,332 |
| 6,290,349 | 6,428,155 | 6,785,016 | 6,870,966 | 6,822,639 | 6,737,591 |
| 7,055,739 | 7,233,320 | 6,830,196 | 6,832,717 | 6,957,768 | 7,456,820 |
| 7,170,499 | 7,106,888 | 7,123,239 | 10/727,181 | 10/727,162 | 7,377,608 |
| 7,399,043 | 7,121,639 | 7,165,824 | 7,152,942 | 10/727,157 | 7,181,572 |
| 7,096,137 | 7,302,592 | 7,278,034 | 7,188,282 | 10/727,159 | 10/727,180 |
| 10/727,179 | 10/727,192 | 10/727,274 | 7,188,164 | 7,523,111 | 10/727,198 |
| 10/727,158 | 10/754,536 | 10/754,938 | 10/727,160 | 10/934,720 | 7,171,323 |
| 7,278,697 | 7,369,270 | 6,795,215 | 7,070,098 | 7,154,638 | 6,805,419 |
| 6,859,289 | 6,977,751 | 6,398,332 | 6,394,573 | 6,622,923 | 6,747,760 |
| 6,921,144 | 10/884,881 | 7,092,112 | 7,192,106 | 7,457,001 | 7,173,739 |
| 6,986,560 | 7,008,033 | 7,551,324 | 7,222,780 | 7,270,391 | 7,195,328 |

-continued

| | | | | | |
|---|---|---|---|---|---|
| 7,182,422 | 7,374,266 | 7,427,117 | 7,448,707 | 7,281,330 | 10/854,503 |
| 7,328,956 | 10/854,509 | 7,188,928 | 7,093,989 | 7,377,609 | 10/854,495 |
| 10/854,498 | 10/854,511 | 7,390,071 | 10/854,525 | 10/854,526 | 7,549,715 |
| 7,252,353 | 10/854,515 | 7,267,417 | 10/854,505 | 7,517,036 | 7,275,805 |
| 7,314,261 | 7,281,777 | 7,290,852 | 7,484,831 | 10/854,523 | 10/854,527 |
| 7,549,718 | 10/854,520 | 10/854,514 | 7,557,941 | 10/854,499 | 10/854,501 |
| 7,266,661 | 7,243,193 | 10/854,518 | 10/934,628 | 7,163,345 | 7,465,033 |
| 7,452,055 | 7,470,002 | 11/293,833 | 7,475,963 | 7,448,735 | 7,465,042 |
| 7,448,739 | 7,438,399 | 11/293,794 | 7,467,853 | 7,461,922 | 7,465,020 |
| 11/293,830 | 7,461,910 | 11/293,828 | 7,270,494 | 11/293,823 | 7,475,961 |
| 7,547,088 | 11/293,815 | 11/293,819 | 11/293,818 | 11/293,817 | 11/293,816 |
| 7,448,734 | 7,425,050 | 7,364,263 | 7,201,468 | 7,360,868 | 7,234,802 |
| 7,303,255 | 7,287,846 | 7,156,511 | 10/760,264 | 7,258,432 | 7,097,291 |
| 10/760,222 | 10/760,248 | 7,083,273 | 7,367,647 | 7,374,355 | 7,441,880 |
| 7,547,092 | 10/760,206 | 7,513,598 | 10/760,270 | 7,198,352 | 7,364,264 |
| 7,303,251 | 7,201,470 | 7,121,655 | 7,293,861 | 7,232,208 | 7,328,985 |
| 7,344,232 | 7,083,272 | 11/014,764 | 11/014,763 | 7,331,663 | 7,360,861 |
| 7,328,973 | 7,427,121 | 7,407,262 | 7,303,252 | 7,249,822 | 7,537,309 |
| 7,311,382 | 7,360,860 | 7,364,257 | 7,390,075 | 7,350,896 | 7,429,096 |
| 7,384,135 | 7,331,660 | 7,416,287 | 7,488,052 | 7,322,684 | 7,322,685 |
| 7,311,381 | 7,270,405 | 7,303,268 | 7,470,007 | 7,399,072 | 7,393,076 |
| 11/014,750 | 11/014,749 | 7,249,833 | 7,524,016 | 7,490,927 | 7,331,661 |
| 7,524,043 | 7,300,140 | 7,357,492 | 7,357,493 | 7,566,106 | 7,380,902 |
| 7,284,816 | 7,284,845 | 7,255,430 | 7,390,080 | 7,328,984 | 7,350,913 |
| 7,322,671 | 7,380,910 | 7,431,424 | 7,470,006 | 11/014,732 | 7,347,534 |
| 7,441,865 | 7,469,989 | 7,367,650 | 7,469,990 | 7,441,882 | 7,556,364 |
| 7,357,496 | 7,467,863 | 7,431,440 | 7,431,443 | 7,527,353 | 7,524,023 |
| 7,513,603 | 7,467,852 | 7,465,045 | | | |

The disclosures of these applications and patents are incorporated herein by reference.

BACKGROUND OF THE INVENTION

A market has developed for inkjet printers that can dock directly with digital cameras. These printers are expected to download and print the photographs quickly and with a minimum of user input. A significant part of the delay between docking the camera and printing the photographs, is the processing time needed to prepare the image data for the printhead.

The major processing tasks are JPEG decompression, colour space conversion, image rotation and halftoning to convert the colour values into dots. These tasks are briefly explained below.

Colour can be specified using three independent variables. The variables are essentially coordinates in a colour space. The same colour can be specified in different colour spaces using different variables. Each colour space has a particular use or application. RGB (red, green, blue) is the natural colour space for devices that emit light such as television screens or computer monitors. CMY (cyan, magenta, yellow) is the natural colour space for devices that display images with reflected light such as printed images from a printer. $YC_RC_B$ (luminance, chrominance red, chrominance blue) separates the luminance from the chrominance (usually abbreviated to 'chroma') channels for more convenient data compression. Humans are more sensitive to luminance than chroma so any change in chrominance resulting from compression and subsequent decompression will be less noticeable than an equivalent change in luminance. This means both chroma channels can be heavily compressed as long as the luminance is lightly compressed. With two of the three channels heavily compressed, YCC image data is more efficiently handled by the processor.

Digital cameras capture images natively in RGB. For efficient storage, the images are converted to YCC and compressed. Image data downloaded from a camera is typically in sYCC which is a widely recognized standard form of YCC. This must then be colour space converted when it is output to a screen or printer.

If the image is downloaded to a printer, the data is converted to the printer's colour space and the separate colour channels are halftoned with a dither matrix. Halftoning exploits the eye's perception of a spatial average of printed dots to reproduce contone (continuous tone) images. Inkjet printers can either print a dot at any one of the addressable locations on the media, or not. However, dots dispersed over area of white (say) paper, will appear to eye as a contone shade somewhere between white and the dot colour, depending on the number of dots.

The dither matrix covers a small area of the image at a time. The matrix has a range of threshold values dispersed throughout its sites. The contone colour levels for each pixel are compared to the spatially corresponding threshold values within the matrix. If the contone level exceeds the threshold value, a dot of that colour is printed (or equivalently, a dot is printed if the contone level is greater than or equal to the threshold, or less than, or less than or equal to the threshold value). This will produce many micro-differences between the contone and halftone image, but the eye is largely insensitive to these high frequency differences.

To produce a colour image, the separate halftoned images for each of the three colour channels are superimposed by the printer on the media. Printers typically have cyan, magenta, yellow and sometimes black (to conserve the other inks and provide a 'truer' black). This is abbreviated to CMYK (Cyan, Magenta, Yellow and blacK). If the print resolution, or dots per inch (dpi) is high enough, halftoning can reproduce any colour in the printer's gamut (palette of printable colours). Accordingly, the individual dots in CMY(K) space are colour averaged by the eye to reproduce the colours of the original image.

Downloaded images can be manipulated and enhanced on a computer prior to printing. However, if downloaded directly from a camera to a photo printer, the user does not have an opportunity to manually enhance and view the images prior to printing. Even so, it is possible to incorporate some relatively basic image enhancement into the printer that can be automatically and uniformly applied to the images prior to printing.

One common and relatively basic image enhancement technique is histogram expansion. It improves the colour contrast by expanding the range of colours present in the raw image data so that it is more evenly spread across the entire range of available colours. To do this, it is necessary to collect image statistics and build histograms for each colour channel. This involves the collection of the three colour levels for each pixel and recording the number of pixels that fall into a range of discrete colour level intervals to build the histograms. Usually the original image will have histograms with at least one sparsely populated region. By re-assigning all the pixels in the sparsely populated region into one of the colour levels, the rest of the histogram can expand into the vacated region. Spreading the pixels more evenly across the histogram improves the colour contrast. As the number of pixels in the sparsely populated regions is insignificant, reassigning them to a single colour level has little, if any, detrimental effect on the image. So in the vast majority of cases, the net effect of histogram expansion is an enhancement of the image.

Unfortunately, the processing tasks associated with histogram expansion can delay printing. In some printing applications, there is an expectation that the printer will start printing the downloaded images almost instantly. Photograph printers that dock directly with the camera are one such example. The captured images will typically download from the camera upon docking and automatically print the images to 6 inch by 4 inch photo grade paper. Users prefer, if not expect, to see their photos being printed within a few seconds. More importantly, users expect good quality prints, but, as discussed above, computationally intensive image enhancement is counter to quickly initiating the printing of downloaded photos.

SUMMARY OF THE INVENTION

According to a first aspect, the present invention provides a method of manipulating contone image data to be halftoned with a dither matrix, the method comprising:
   determining at least one characteristic of the contone image data;
   using the at least one characteristic to derive a secondary dither matrix from a predetermined primary dither matrix; and,
   halftoning the contone image data with the secondary dither matrix.

Manipulating the dither matrix can be equivalent to performing image enhancement manipulations to the input image data. However, it far less computationally intensive to manipulate the dither matrix instead of all the raw image data. For example, if the dither matrix is (say) 64×64, with each element being an 8 bit value, it has roughly 4 kilobytes of data. By comparison, a digital photograph (6 inches by 4 inches) at 3 mega-pixel native resolution, is about 10 megabytes of data. So, in this example, the number of manipulations to the dither matrix is about three orders of magnitude less than that needed for the image data to achieve the same net effect. As discussed above, histogram expansions are a very common image enhancement technique and simply compressing the range of threshold values in the dither matrix as an inverse to the desired expansion of the histogram provides an equivalent result with far less processing. Furthermore, as the data in the dither matrix is a tiny fraction of the input data, the dither matrix can be given added complexity, or granularity, in order to achieve a better result than a normal histogram expansion, while still providing greater computation efficiency.

According to a second aspect, the present invention provides a print engine controller for an inkjet printer, the print engine controller comprising:
   a processor for receiving contone image data;
   memory storing a predetermined primary dither matrix; wherein,
   the processor is configured to determine at least one characteristic of the contone image data and derive a secondary dither matrix from the primary dither matrix using the at least one characteristic of the contone image data; such that,
   the contone image data is halftoned with the secondary dither matrix prior to printing.

Preferably, the contone image data has colour level values for pixels in the image, the colour level values having a certain distribution within a predetermined range of discrete colour levels, and, the at least one characteristic of the contone image data relates to said certain distribution.

Preferably, the primary dither matrix has a range of threshold values and the secondary dither matrix has a compressed range of threshold values for comparison to the colour level values of the contone image data during halftoning.

In a further preferred form, the at least one characteristic related to the certain distribution is the minimum number of contiguous discrete colour levels containing a predetermined portion of the pixels, divided by the total number of levels in the predetermined range of discrete colour levels. In some embodiments, the predetermined portion of the pixels is greater than 90%.

Optionally, the at least one characteristic related to the certain distribution is:

$$(L_{max}-L_{min})/L_{total}$$

Where:
   $L_{max}$ is the maximum number of discrete colour levels if a top-most portion of the colour level values of the contone image data is disregarded;
   $L_{min}$ is the minimum number of discrete colour levels that contain a bottom-most number of the colour level values of the contone image data; and,
   $L_{total}$ is the total number of levels in the range of discrete colour levels.

In these embodiments, the top-most portion may be the highest 5% of the colour level values of the contone image data. Likewise, the bottom-most portion may be the lowest 5% of the colour level values of the contone image data. In a less aggressive enhancement, the top and bottom-most portions may be 1%.

In preferred embodiments, the threshold values in the compressed range in the secondary matrix are determined in accordance with the following algorithm:

$$T_{new}=L_{min}+T_{old}(L_{max}-L_{min})/L_{total}$$

where:
   $T_{new}$ is the compressed threshold values in the secondary dither matrix; and,
   $T_{old}$ is the threshold value in the primary dither matrix.

Optionally, at least some of the thresholds in the primary dither matrix are not whole numbers and the compressed threshold values in the secondary matrix are rounded or truncated to the nearest whole numbers. In other options, the threshold values occur in the primary dither matrix a predetermined number of times and the compressed threshold values occur in the secondary dither matrix a greater number of times, the greater number being approximately equal to $L_{total}/(L_{max}-L_{min})$ multiplied by the predetermined number associated with the threshold values of the primary matrix, or only one of two colliding threshold values from the primary matrix, that correspond to the compressed threshold.

In some preferred embodiments the processor only samples a portion of the pixels of the contone image data to determine $L_{min}$ and $L_{max}$.

Optionally, the colour levels values are an eight bit binary number such that there are 256 ($2^8$) levels in the range of discrete colour levels. Optionally, the dither matrix is 64×64 and the threshold levels range from 1 to 255 prior to compression.

BRIEF DESCRIPTION OF THE DRAWINGS

The invention will now be described, by way of example only, with reference to the preferred embodiments shown in the accompanying drawings in which:

FIG. 5 shows the dither matrix with compressed threshold values calculated to two decimal places; and, FIG. 6 shows the dither matrix with compressed threshold values rounded to the nearest whole number.

DETAILED DESCRIPTION OF THE PREFERRED EMBODIMENTS

As discussed in the Background to the Invention, photograph printers have recently been developed that dock directly with a digital camera and automatically printed the captured images. They are expected to print the images quickly and with photographic quality. Furthermore, these printers will only offer rudimentary image enhancement options, if any at all. Users that want more complex image enhancement of their photos will download the images to desktops or laptops and manipulate them with PhotoShop™ or similar software (note that PhotoShop is a trademark of Adobe Systems Inc).

As the present invention offers basic image enhancement with computational efficiency, it is well suited to photo printers. In light of this, it will be described with specific reference to this application. However, skilled workers will readily appreciate that the invention is not limited to photo printers and is suitable for a wide range of applications.

Figure 1:
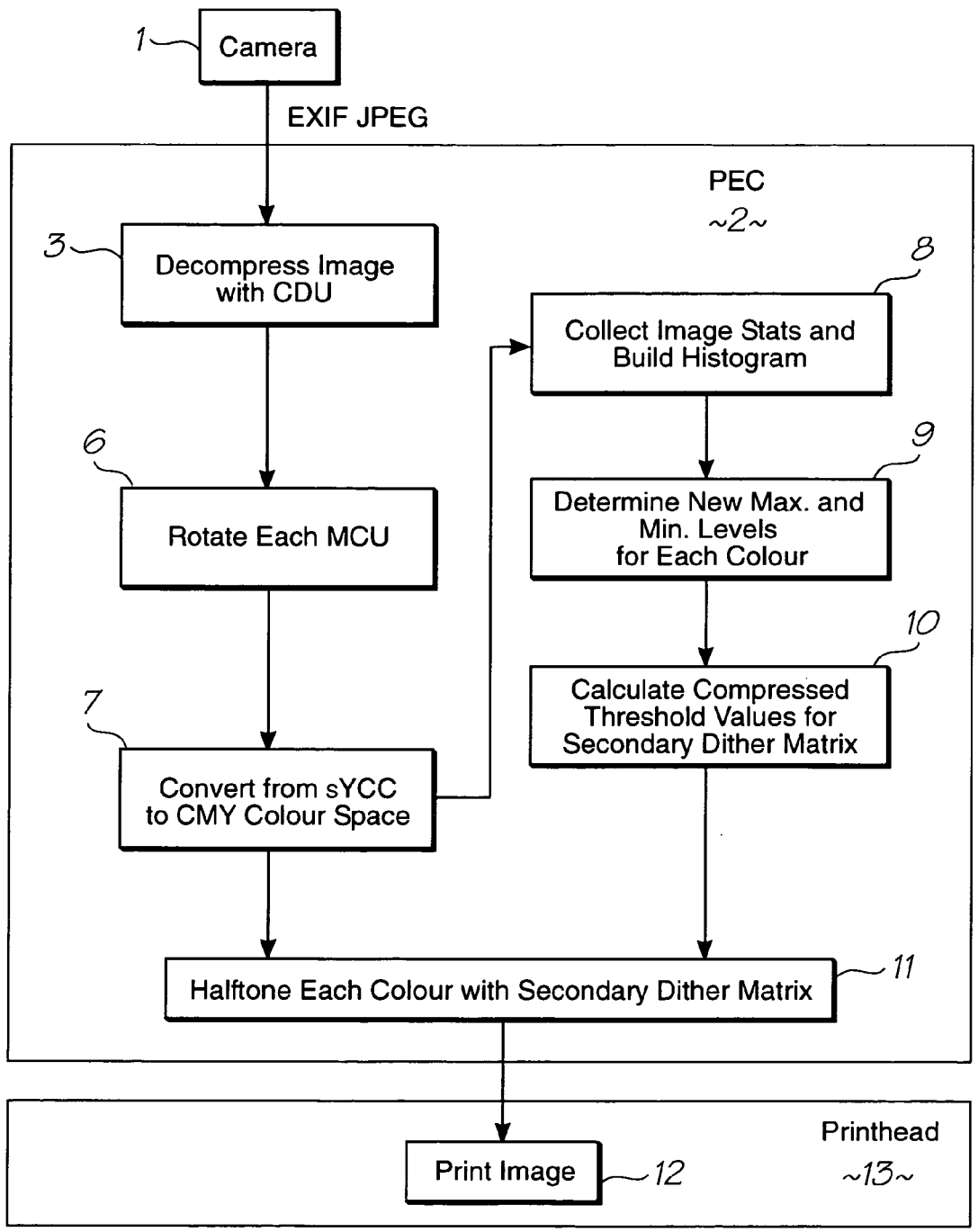
FIG. 1 shows a print engine pipeline in accordance with the present invention.

FIG. 1 shows a print engine pipeline for the image data from the camera 1 to the printhead 13. When the camera docks with the printer, the images are downloaded to the print engine controller (PEC) 2 as EXIF (exchangeable image file data) JPEG (joint photographic expert group) files in sYCC colour space (or standard YCC colour space). The PEC 2 decompresses the images with a contone decoder unit (CDU) 3. If the image is too large 4, it is downsampled 5 as it is decoded.

As the pixel data from each JPEG MCU (minimum coding unit) becomes available, it is rotated and converted to the specific CMY colour space 7 of the printhead 13.

Once the data is in the CMY space, the PEC 2 can collect image statistics and build a histogram 8. The collection of image statistics involves building a histogram of the number of occurrences of each color level. Once the histograms for the image are known, the degree of histogram expansion can be determined. This can be done in any number of ways and one particular method will be discussed below with reference to FIGS. 3 and 4.

Expanding the histogram requires new maximum and minimum colour levels to be determined 9. That is, a minimum level, $L_{min}$, is determined and mapped to 0. All levels between 0 and $L_{min}$ are also mapped to 0. Likewise, $L_{max}$ is determined and mapped to the highest colour level value. For example, if the colour levels are 8 bit numbers, the highest is 255. Every level between $L_{max}$ and 255 is also mapped to 255.

However, as the present invention manipulates the dither matrix to enhance the image rather than the colour levels in the image data, the only characteristic of the histogram that the PEC 2 needs is the degree of histogram expansion that would be caused by the $L_{min}$ and $L_{max}$ determined by the chosen method. There is no need to map any of the colour levels in the image data to new levels.

The histogram is expanded by a factor of $255/(L_{max}-L_{min})$. Hence, the corresponding compression of the range of threshold values in the dither matrix is given by:

$$T_{new}=L_{min}+T_{old}\cdot(L_{max}-L_{min})/255 \qquad \text{EQ (1)}$$

Where:
$T_{new}$ is the compressed threshold; and,
$T_{old}$ is the original threshold value.

If the dither matrix size is 64×64, then compressing the threshold values involves the manipulation of about 4 kB of data, whereas the equivalent expansion of the input colour levels is a manipulation of about 10 MB of data, or possibly more depending on image resolution. Compressing the dither matrix is more computationally efficient than expanding the image data by several orders of magnitude. This can dramatically reduce any delay between docking the camera and printing the downloading images, and it also allows more complex image enhance techniques via the dither matrix while still remaining far less computationally intensive than performing equivalent techniques on the input data.

Once the compressed dither matrix values have been calculated 10, the CMY colour values determined at stage 7 of the print engine pipeline, are compared directly with the compressed threshold values of the dither matrix to produce a halftone image of each colour channel 11. It will be appreciated that the same matrix can be used for each channel, or separate dither matrices derived from respective histograms could be used for each colour channel.

The halftoned images are sent to the printhead 13 for printing 12 to complete the pipeline.

Figures 2, 3:
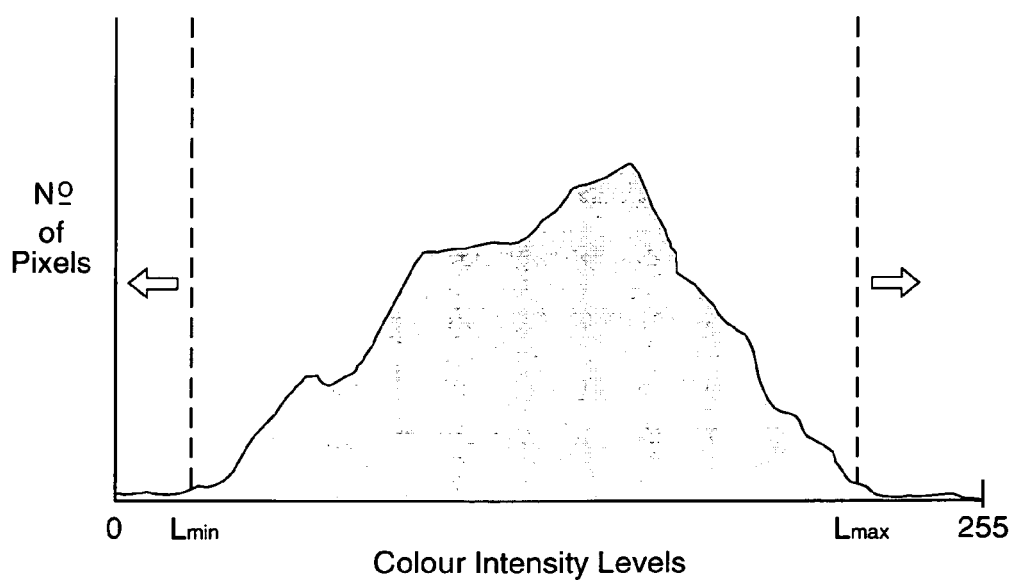
FIG. 2 shows a dither matrix partially completed with threshold values.
FIG. 3 shows a histogram of the image data for one of the colour channels.

FIG. 2 shows an example of a 64 by 64 dither matrix. For simplicity, it is only partially completed with the range of threshold values. If the threshold values are 8 bit (corresponding to 8 bit colour levels), there are 255 thresholds. All 255 threshold levels appear in the matrix a number of times and the number of times a particular threshold occurs depends on the characteristics of the printhead and the aim to achieve a perceptually uniform colour space.

As discussed above, the dither matrix is repeatedly tiled across the contone image and the separate colour levels for pixel are compared to a corresponding threshold in the dither matrix. If the colour level exceeds the threshold, the printhead will eject a drop (of that particular colour) at that location, and if it is less than the threshold, no drop is ejected. Because the eye spatially averages the colour, it does not see the high frequency differences between the contone image and the halftoned image.

Figures 4, 6:
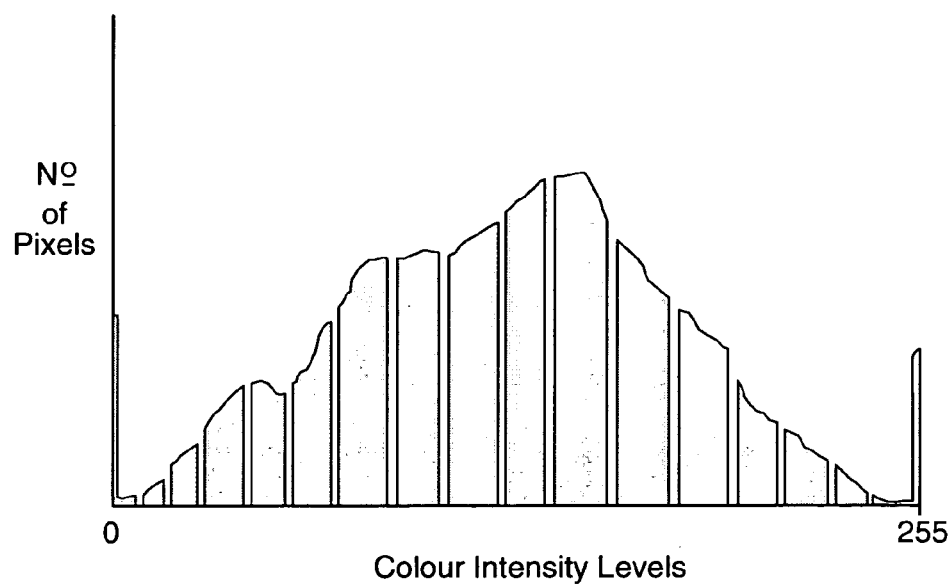
FIG. 4 shows the histogram of FIG. 3 expanded to enhance colour contrast.

Referring now to FIG. 4, the histogram for input image data is shown. $L_{min}$ and $L_{max}$ can be derived in any number of ways. For example, many images will not have a pixel at level 0, or a pixel at level 256. In this case, $L_{min}$ and $L_{max}$ can simply be the highest and lowest colour levels sampled. However, this does not take into account the tendency for the highest and lowest sampled colour levels to be outliers from the histogram distribution. Hence, using outliers as $L_{min}$ and $L_{max}$ usually means the histogram is not expanded as much as it should.

A better approach is to select a portion of the pixels at either end of the histogram and set the highest of the low end portion to be $L_{min}$, and the lowest of the high end portion to be $L_{max}$. Some experimentation may be required to optimize for each print engine pipeline, but taking the top and bottom 1/256 (or approximately 0.4%) of the histogram will usually account for any outliers. In other words, 0.4% of the samples are below $L_{min}$ and 0.4% of the samples are above $L_{max}$. This approach is likely to provide visually better results than simply taking the extreme levels however, it is slightly more computationally intensive. There is also a risk of over expansion by taking a percentage from the top and bottom of the histogram. Too much expansion can introduce visible contouring in areas of with a ramped colour gradient (because of the large colour differences between adjacent pixels after expansion). To guard against this, the processor might impose a maximum allowable expansion.

Once $L_{min}$ and $L_{max}$ have been determined, any samples at $L_{min}$ or below are mapped to 0, and any sample at $L_{max}$ or more are mapped to 256. As shown in FIG. 5, the remainder of the histogram is then expanded between 0 and 255. There are spikes at 0 and 256 because they now contain all the original $L_{min}$ and $L_{max}$ samples, as well as the outliers. However, this is not likely to have any detrimental effect on image quality. Traditionally, histogram expansion has been done with the level mapping function given by:

$$L_{new}=256 \cdot (L_{old}-L_{min})/(L_{max}-L_{min}) \quad \text{EQ (2)}$$

This function would be applied to the input levels to determine the expanded levels, the expanded levels then compared to the threshold values of the dither matrix. Therefore, it is equivalent and computationally easier to compress the range of threshold values by the inverse of the expansion that would otherwise be performed on the histogram. The algorithm for mapping each of the original threshold values to new threshold values is given by equation 1 discussed above.

FIG. 5 shows the dither matrix of FIG. 2 compressed in accordance with equation 1. Unfortunately, the compressed threshold values must be rounded or truncated to whole numbers as the hardware requires the dithering process to be a whole number comparison. Hence the threshold values of FIG. 2 are rounded to give the whole number thresholds shown in FIG. 6.

Manipulating the input levels via the dither matrix also presents an opportunity to improve the image enhancement beyond that offered by histogram expansion.

During histogram expansion, mapping the old levels to new levels via equation 2 involves rounding as the new levels need to be integers (because of the printer hardware). Hence, some of the levels in the expanded histogram have no samples in them. As shown in FIG. 4, these appear as gaps in the histogram. The colour difference between samples on either side of a gap is greater than the difference between the same samples in the unexpanded histogram. These increased colour differences are more likely to produce visible contouring in the printed image.

Likewise, rounding (or truncating) the compressed threshold values in the dither matrix causes some of the thresholds to collide. For example, the shaded thresholds in the compressed matrix of FIG. 6 are pairs of equal value whereas, the corresponding threshold in the original matrix (see FIG. 2) were not equal. Consequently, the number of dots added when moving from one tone level to the next will not be smooth. Again, this increases the risk of visible contouring in the printed image.

Increasing the granularity of the dither matrix (that is, using threshold values greater than 8 bits), would avoid collisions and smooth out the number of dots added to the halftone image with each subsequent tone level. Unfortunately, in most printers, the comparison of the dither matrix with the contone CMY levels is a hardware function that requires the threshold values to be 8 bit integers only.

Alternatively, the software can reconstruct the original dither matrix at a higher granularity for a perceptually smooth transition between tone levels. This will effectively add sublevels to each threshold so any collisions will between 2 sub-levels and consequently involve far fewer dots.

The problem of threshold collision and the solution of higher granularity are illustrated in the tables below. Firstly, Table 1 shows the number of times some threshold values appear in the original matrix and the compressed matrix. The 64 by 64 matrix has 4096 elements so each of the 1 to 255 original threshold values will occur 4096/255, or about 16 times in the original matrix. When the matrix is compressed, rounding causes some of the original thresholds to map to the same compressed threshold. These colliding thresholds appear 32 times in the compressed matrix (e.g. compressed threshold 38 in FIG. 6). So the number of dots added when moving from tone level 37 to 38, will be twice that of moving 38 to 39, or 36 to 37. Hence the increased risk of visually perceptible contouring.

TABLE 1

Inconsistent Occurrences of Compressed Thresholds because of Threshold Collision

| Original Threshold | Occurrences in Original Matrix | Compressed Threshold (Rounded) | Occurrences in Compressed Matrix |
|---|---|---|---|
| 34 | 16 | 46 | 16 |
| 35 | 16 | | |
| 36 | 16 | 47 | 32 |
| 37 | 16 | 48 | 16 |
| 38 | 16 | 49 | 16 |
| 39 | 16 | | |
| 40 | 16 | 50 | 32 |

For the purposes of this example, we will assume the thresholds in the compressed matrix should occur 21 times each (4096/(Lmax−Lmin)=21.005—so one threshold would occur 22 times) for least risk of visible contours. By adding granularity to the original matrix, the occurrences of the compressed thresholds can be more uniform. For example, if the original threshold values are 12 bit (or rather 8.2 bit) the original matrix essentially gains extra threshold levels. Table 2 sets out the finer grained original thresholds and the smoothing effect this has on the compressed matrix.

| Original Threshold | Occurrences in Original Matrix | Compressed Threshold (Rounded) | Occurrences in Compressed Matrix |
|---|---|---|---|
| 35.00 | 4 | 47 | 20 |
| 35.25 | 4 | 47 | |
| 35.50 | 4 | 47 | |
| 35.75 | 4 | 47 | |
| 36.00 | 4 | 47 | |
| 36.25 | 4 | 48 | 20 |
| 36.50 | 4 | 48 | |
| 36.75 | 4 | 48 | |
| 37.00 | 4 | 48 | |
| 37.25 | 4 | 48 | |
| 37.50 | 4 | 49 | 20 |
| 37.75 | 4 | 49 | |
| 38.00 | 4 | 49 | |
| 38.25 | 4 | 49 | |
| 38.50 | 4 | 49 | |
| 38.75 | 4 | 50 | 24 |
| 39.00 | 4 | 50 | |
| 39.25 | 4 | 50 | |
| 39.50 | 4 | 50 | |
| 39.75 | 4 | 50 | |
| 40.00 | 4 | 50 | |

With the increased granularity, there are smaller inconsistencies in the number of times the compressed thresholds appear in the final matrix. Most compressed thresholds occur 20 times with about a quarter appearing 24 times. Therefore, moving from one tone level to the next is smoother and there is far less likelihood of any visible contouring.

Instead of increasing the granularity of the original matrix, it may be simpler to multiply the number of times each threshold appears in the original matrix by the inverse of the compression to determine the number of times the compressed threshold appears in the final matrix. Referring again to the above example, the inverse of the compression is $256/(L_{max}-L_{min})=1.313$. If an original threshold occurred 16 times in the matrix, the compressed threshold might ideally occur $1.313 \times 16 = 21$ (with one threshold occurring 22 times). Of course, if two original thresholds are colliding at a single compressed threshold, the occurrences of only one of the original thresholds should be used to determine how many times the compressed threshold occurs.

Enhancing the image by manipulating the dither matrix means that gathering image statistics can be reasonably heavily optimized because the impact of granularity issues on the final matrix (and therefore the printed image) is relatively minor. For example, in some applications, the histogram need not have 256 levels. 64 levels (6 bit) may be adequate. When building the histogram, it may not be necessary to collect statistics for every pixel. Sampling as little as 1 in 256 pixels can be within acceptable output errors. When calculating $L_{max}$ and $L_{min}$, portions of the image that can no longer have any impact on the end points of the histogram, may be ignored. Likewise, reasonable results may be obtained by computing or looking up a minimum and maximum value from each colour point, rather than each of the individual CMY values. All these optimizations serve to reduce the processing burden on the PEC, and so shorten the time between docking the camera and printing the images.

The invention has been described here by way of example only. Skilled workers in this field will readily recognize many variations and modifications that do not depart from the spirit and scope of the broad inventive concept.

The invention claimed is:

1. A method of operating a micro-processor to manipulate a contone image data to be halftoned with a dither matrix, the contone image data having colour level values for pixels in the image, the colour level values having a certain distribution within a predetermined range of discrete colour levels, the method comprising:

deriving a secondary dither matrix from a predetermined primary dither matrix, the primary dither matrix having a range of threshold values and the secondary dither matrix has a compressed range of threshold values, the compressed range of threshold values being determined in accordance with the following algorithm:

$$T_{new} = L_{min} + T_{old}(L_{max} - L_{min})/L_{total}$$

where:

$L_{max}$ is the maximum number of discrete colour levels if a predetermined top-most portion of the colour level values of the contone image data is disregarded;

$L_{min}$ is the minimum number of discrete colour levels that contain a predetermined bottom-most number of the colour level values of the contone image data;

$L_{total}$ is the total number of levels in the range of discrete colour levels;

$T_{new}$ is the compressed threshold values in the secondary dither matrix; and, $T_{old}$ is the threshold value in the primary dither matrix; and, halftoning the contone image data with the secondary dither matrix.

2. A method according to claim 1 wherein the top-most portion are the highest 5% of the colour level values of the contone image data and the bottom-most portion may be the lowest 5% of the colour level values of the contone image data.

3. A method according to claim 2 wherein the top and bottom-most portions are 1% of the colour level values of the contone image data.

4. A method according to claim 3 wherein the threshold values in the primary dither matrix occur a predetermined number of times and the compressed threshold values occur in the secondary dither matrix a greater number of times, the greater number being approximately equal to $L_{total}/(L_{max}-L_{min})$ multiplied by the predetermined number associated with the threshold values of the primary matrix.

5. A print engine controller for an inkjet printer, the print engine controller comprising:

a processor for receiving contone image data, the contone image data having colour level values for pixels in the image;

memory storing a predetermined primary dither matrix, the primary dither matrix having a range of threshold values; wherein, the processor is configured to determine at least one characteristic of the contone image data and derive a secondary dither matrix, the secondary dither matrix has a compressed range of threshold values for comparison to the colour level values of the contone image data during halftoning; such that, the contone image data is halftoned with the secondary dither matrix prior to printing;

wherein the threshold values in the compressed range in the secondary matrix are determined in accordance with the following algorithm:

$$T_{new} = L_{min} + T_{old}(L_{max} - L_{min})/L_{total}$$

where:
- $T_{new}$ is the compressed threshold values in the secondary dither matrix;
- $T_{old}$ is the threshold value in the primary dither matrix;
- $L_{max}$ is the maximum number of discrete colour levels if a top-most portion of the colour level values of the contone image data is disregarded;
- $L_{min}$ is the minimum number of discrete colour levels that contain a bottom-most number of the colour level values of the contone image data; and,
- $L_{total}$ is the total number of levels in the range of discrete colour levels.

6. A print engine controller according to claim 5 wherein the top-most portion are the highest 5% of the colour level values of the contone image data and the bottom-most portion are the lowest 5% of the colour level values of the contone image data.

7. A print engine controller according to claim 5 wherein at least some of the thresholds in the primary dither matrix are not whole numbers and the compressed threshold values in the secondary matrix are rounded or truncated to the nearest whole numbers.

8. A print engine controller according to claim 5 wherein the threshold values occur in the primary dither matrix a predetermined number of times and the compressed threshold values occur in the secondary dither matrix a greater number of times, the greater number being approximately equal to $L_{total}/(L_{max}-L_{min})$ multiplied by the predetermined number associated with the threshold values of the primary matrix, or only one of two colliding threshold values from the primary matrix, that correspond to the compressed threshold.

9. A print engine controller according to claim 5 wherein the processor only samples a portion of the pixels of the contone image data to determine $L_{min}$ and $L_{max}$.

* * * * *